United States Patent [19]
Lenhart

[11] Patent Number: 4,768,643
[45] Date of Patent: * Sep. 6, 1988

[54] GUIDE RAIL AND DEADPLATE ALIGNMENT DEVICE FOR FLEXIBLE WALL CONTAINER VACUUM TRANSFER

[75] Inventor: Ronald A. Lenhart, Lakewood, Colo.

[73] Assignee: Meyer Conveyair, Inc., Arvada, Colo.

[*] Notice: The portion of the term of this patent subsequent to Jun. 2, 2004 has been disclaimed.

[21] Appl. No.: 836,811

[22] Filed: Mar. 6, 1986

Related U.S. Application Data

[63] Continuation-in-part of Ser. No. 700,748, Feb. 12, 1985, Pat. No. 4,669,604.

[51] Int. Cl.[4] .............................................. B65G 47/26
[52] U.S. Cl. .................................. 198/453; 198/689.1
[58] Field of Search ............... 198/457, 453, 454, 455, 198/689.1

[56] References Cited

U.S. PATENT DOCUMENTS

| | | | |
|---|---|---|---|
| 3,352,404 | 11/1967 | Settembrini | 198/689.1 |
| 3,889,801 | 6/1975 | Boyer | 198/689.1 |
| 4,323,149 | 4/1982 | Pavone | 198/689.1 X |
| 4,544,059 | 10/1985 | Mernoe | 198/453 |
| 4,560,060 | 12/1985 | Lenhart | 198/453 X |

FOREIGN PATENT DOCUMENTS

| | | | |
|---|---|---|---|
| 2411317 | 10/1974 | Fed. Rep. of Germany | 198/452 |
| 2505333 | 8/1975 | Fed. Rep. of Germany | 198/454 |
| 3001652 | 7/1981 | Fed. Rep. of Germany | 198/844 |

*Primary Examiner*—Stephen J. Novosad
*Assistant Examiner*—William P. Neuder
*Attorney, Agent, or Firm*—Fields, Lewis, Pittenger & Rost

[57] ABSTRACT

A deadplate construction is provided for maintaining an equilateral contiguous triangular configuration of flexible walled containers as they move across the deadplate. The containers are held in this alignment by side rails which engage the containers at their rigid bottommost portion and has a downstream edge whose most downstream portion is truncated so that the downstream container is subjected to the vacuum of the transfer belt before the other containers in the diagonal row. In addition, adjacent the downstream edge of the deadplate are slots which correspond in width and positioning to the openings in the transfer belt for the outside container and a narrower slot is provided over one of the rows of openings in the transfer belt for the center container. This arrangement assures that the containers are not prematurely drafted onto the transfer belt but that the outside container moves ahead of the other containers as it moves onto the transfer belt so that the deflector will bring all of the containers into single file alignment by the time they reach downstream single file rails.

9 Claims, 2 Drawing Sheets

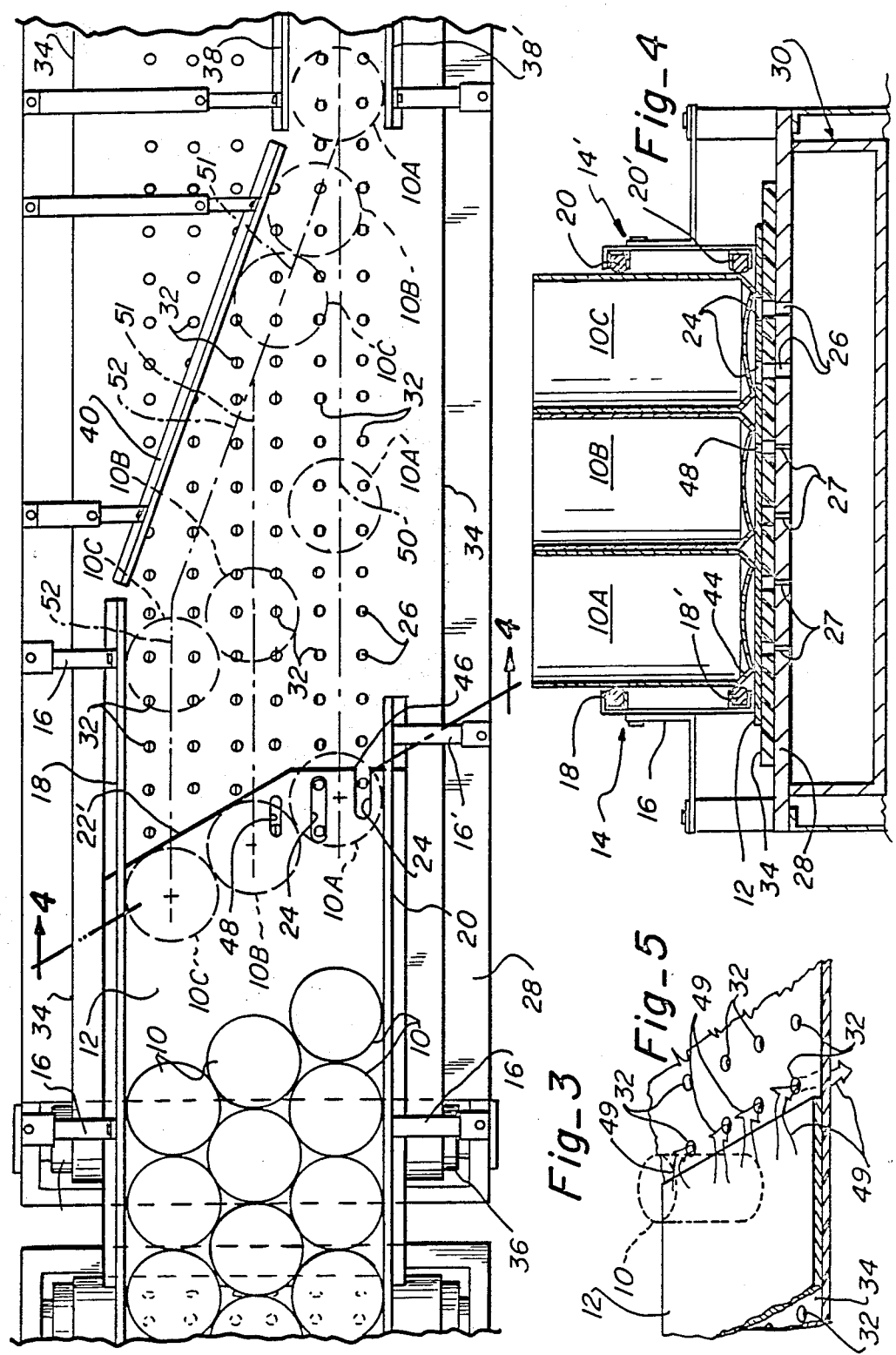

GUIDE RAIL AND DEADPLATE ALIGNMENT DEVICE FOR FLEXIBLE WALL CONTAINER VACUUM TRANSFER

This application is a continuation-in-part of my copending U.S. patent application Ser. No. 700,748 filed Feb. 12, 1985, now U.S. Pat. No. 4,669,604.

TECHNICAL FIELD

This invention relates to an improvement in a vacuum single filer and more particularly apparatus for supplying the containers in a prearranged pattern to the vacuum single filer so that they will always be in proper orientation to be brought into single file, even at very high speeds.

BACKGROUND ART

Various prior art devices have been devised for bringing containers which are in a bulk or multiple row arrangement into single row alignment. However, these have inherently had certain disadvantages. Devices have been provided wherein multiple rows of containers are moved downstream on a conveyor belt and diagonal deflectors extend inwardly from both sides to funnel the containers into single file arrangement at the downstream end. Such a device is illustrated in U.S. Pat. No. 1,990,549 to Kimball. These devices have an inherent disadvantage in that the containers tend to bridge across the space between the deflectors and can create a jam resulting in the discontinuance of the flow of containers. Also, such conveyors will only operate satisfactorily at relatively slow speeds, such as under 500 containers per minute.

Roller type conveyors have been provided for conveying multiple rows of containers which are brought into single file by a deflector which extends downstream and diagonally across the conveyor to one side thereof to ultimately bring the containers into single file alignment. Again, such devices must be operated at relatively low speeds. Examples of such devices are shown in U.S. Pat. No. 2,468,290 to Carter and U.S. Pat. No. 2,690,251 to Carter.

A vacuum belt device is illustrated in U.S. Pat. No. 3,352,404 to bring bottles which are dropped down onto the conveyor into longitudinal alignment. This device, however, is not used for bringing multiple rows of containers into single file.

U.S. Pat. No. 4,146,467 to Sauer, et al. discloses a vacuum conveyor for separating misaligned or damaged containers, but has no utility in bringing multiple rows of containers into single file.

A high speed vertical single filer is shown in applicant's U.S. Pat. No. 4,561,806. This device is very efficient and effective for bringing multiple rows of containers into single file at high speed such as in excess of 2,000 containers per minute. Opposite side walls converge and acceleration jets are provided which coact to bring containers into single file alignment as they move from the upstream end to the downstream end. However, one disadvantage is that a relatively long longitudinal path is required in order to accomplish the single filing. Because of the physical constraints presented in some plants, there is not sufficient distance between adjacent stations so that containers can be brought into single file utilizing this vertical single filer. Furthermore, it cannot be used with containers having high frictional surfaces, such as bright containers. Otherwise, jamming will occur at the point of the equilateral triangle formed by the converging containers because of opposite container rotation.

A vacuum single filer is shown in my above-identified U.S. patent application Ser. No. 700,748, filed Feb. 12, 1985. This single filer includes means for arranging a mass of articles into discrete rows of three articles each across a deadplate of the single filer with the articles at the outside end of each row longitudinally aligned with a single file downstream location. The articles are moved at a first predetermined rate of speed. An endless belt vacuum conveyor is provided for moving the discrete rows of articles from the upstream location toward the downstream location at a second and faster rate of speed. The vacuum conveyor extends under the downstream end of the deadplate. The deadplate has a series of longitudinal slots at its downstream edge through which vacuum is drawn by the vacuum conveyor to hold the downstream row in alignment prior to movement onto the belt of the vacuum conveyor. The longitudinal slots prevent the articles from being drafted in an irregular pattern from the downstream edge of the deadplate by air moving downstream across the edge of the deadplate which air is being drawn through slots in the belt. The vacuum holds the outside article in fixed lateral position as it is moved from the upstream location to the downstream location while a diagonal deflector moves the articles in each interior row into single file alignment behind the outside article as the articles are moved from the upstream location to the downstream location. At very high speeds, a difficulty may be encountered in aligning the discrete rows into single file if the outside article in a diagonal row should be held back for any reason. This can occur by the articles rolling against each other and due to the flexibility of the side walls they can be compressed and squeezed together, allowing an interior article to move ahead of an outside article in the same row. If such an event should occur, the inside articles in the row may be positioned far enough ahead of the outside article so that when the articles are being brought into single file alignment an inside article will push the outside article out of position so that it is deflected off of the vacuum belt. This condition can occasionally occur if the containers are not handled in a very precise manner prior to being discharged from the deadplate onto the vacuum belt.

DISCLOSURE OF THE INVENTION

In accordance with the present invention an article alignment device for a vacuum single filer is provided for maintaining flexible wall cylindrical articles, which are supplied at a first upstream location at a first rate of speed in a three-row width having an equilateral triangular configuration in which all articles are contiguous, so that they are discharged onto a vacuum belt at a second downstream location at a second higher rate of speed in a predetermined predictable and repeatable pattern. The apparatus includes a deadplate extending from the upstream location to the downstream location, the deadplate having a diagonal downstream end which is parallel to the centerline of a diagonal row of articles forming the leading edge of the equilateral triangular configuration. A vacuum transfer belt extends downstream from under the downstream end of the deadplate to transfer the articles to a single file location. The transfer belt has a plurality of longitudinal rows of openings. Means is provided for drawing a vacuum through the openings in the transfer belt to hold the articles against the belt. A deflector extends diagonally across the belt to realign the diagonal row of articles into a longitudinal row of articles. A pair of parallel side guides, each having a lower rail against the deadplate, are spaced apart a distance to hold the articles in the equilateral triangular configuration in mutual contacting relationship so that the diagonal rows of articles are aligned with the diagonal end of the deadplate as they are moved thereacross.

More particularly, apertures are provided in the deadplate adjacent the downstream end under only the location of the two most downstream articles in the diagonal row so that vacuum drawn through the transfer belt will positively position these articles as they are pushed across the edge of the deadplate onto the belt. The apertures include a pair of longitudinal vacuum slots extending over the rows of openings in the transfer belt which extend under the portion of the deadplate over which the most downstream article in the diagonal row is positioned. The vacuum through these slots holds the article on the deadplate in precise alignment and prevents it from being drafted onto the belt ahead of time by air moving downstream across the deadplate and into the rows of openings in the vacuum belt. If this article is held in proper alignment, the other two articles in the row will also be prevented from being drafted over the edge of the deadplate because of the constraint of the side rails which are against the deadplate. A third longitudinal vacuum slot extends over one of the rows of openings in the transfer belt which extends under the portion of the deadplate over which the second most downstream article of the diagonal row is positioned. If the first article in the row happens to be missing, this third vacuum slot will prevent the second article from being drafted across the edge of the deadplate, but will hold it in position until it is pushed onto the vacuum belt by the next row of articles. The third article in the row will be held in position by the second article and therefore does not require vacuum slots. The pair of longitudinal slots have a width substantially equal to the diameter of the openings in the transfer belt and the third longitudinal slot has a width substantially equal to one-half the diameter of the openings in the transfer belt. The edge of the diagonal downstream end of the deadplate has a portion over which the most downstream article of the diagonal row passes which is perpendicular to the direction of movement of the transfer belt so that the leading edge of the article extends onto the belt when the row of articles are aligned along the diagonal edge of the downstream end of the deadplate so that the most downstream article is drawn to and moved downstream by the transfer belt before the other articles in the row to space the most downstream article ahead of the centerline of the diagonal row.

From the foregoing, the advantages of this invention are readily apparent. By use of guide means having a side rail against the deadplate the articles can be held in precise alignment on the deadplate and not be prematurely drafted onto the vacuum belt. The particular deadplate construction assures that the outside downstream article is moved ahead of the others in each diagonal row so that single file alignment will be assured at any speed.

Additional advantages of this invention will become apparent from the description which follows, taken in conjunction with the accompanying drawings.

BRIEF DESCRIPTION OF THE DRAWINGS

FIG. 3 is a top plan view, similar to FIG. 1, but showing the deadplate arrangement of the present invention which maintains the alignment of the articles;

FIG. 4 is an enlarged horizontal section, taken along line 4—4 of FIG. 3, showing the proper alignment of the articles; and FIG. 5 is a fragmentary perspective view showing how air moving through the vacuum belt tends to draft articles over the edge of the deadplate.

BEST MODE FOR CARRYING OUT THE INVENTION

Figures 1, 2:
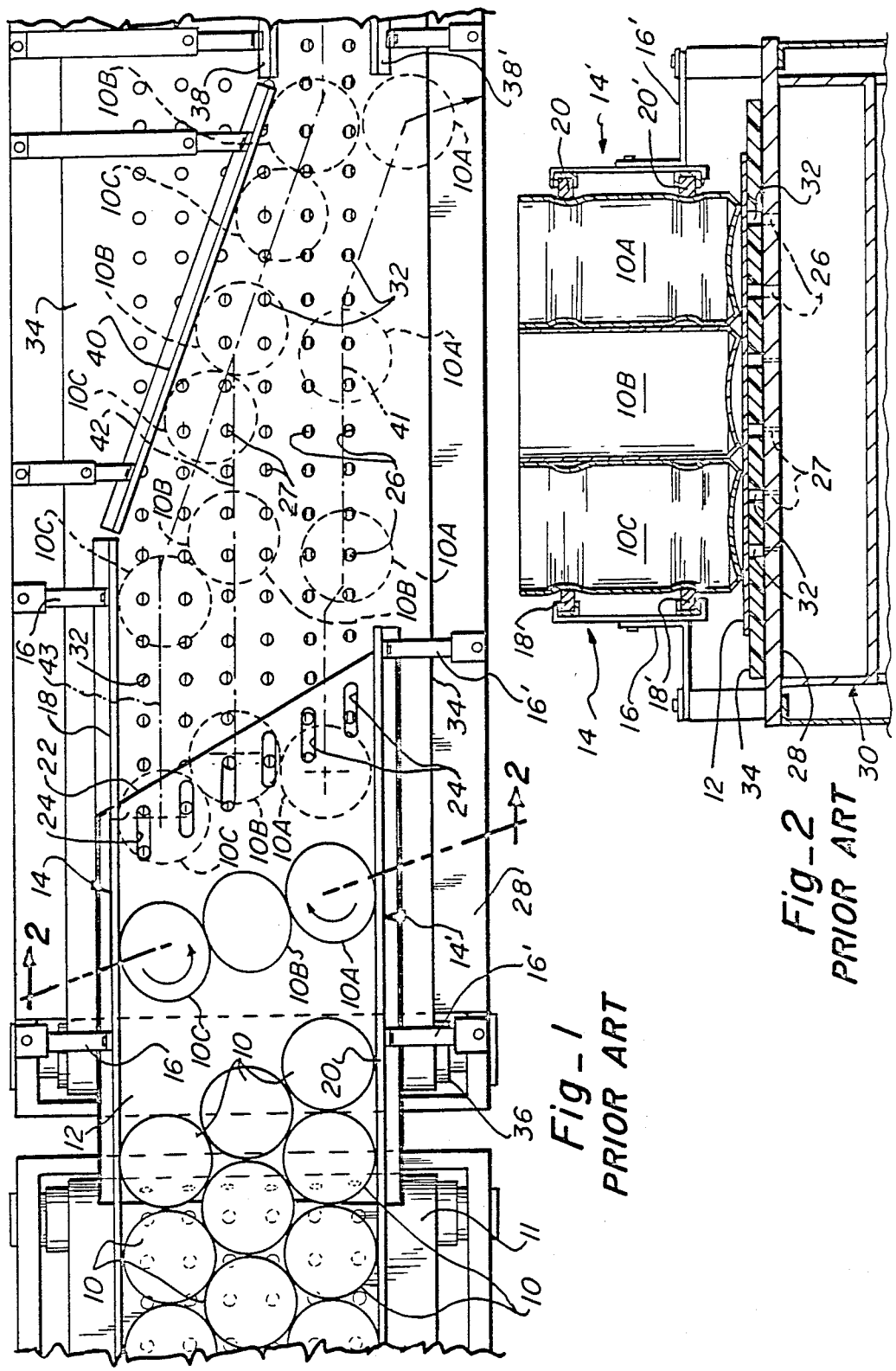
FIG. 1 is a top plan view of the deadplate of a prior art vacuum single filer illustrating the difficulty in keeping the articles properly aligned as they leave the downstream edge of the deadplate.
FIG. 2 is an enlarged horizontal section, taken along line 2—2 of FIG. 1, showing how the sidewalls of the containers may be deflected.

In order to understand the present invention, it is necessary to understand the problem which occasionally arises with respect to the prior art construction. This prior art construction is shown in FIGS. 1 and 2. A mass of containers 10 are moved by vacuum belt 11 onto a deadplate 12 at a first rate of speed and in a tight contiguous equilateral triangular configuration as shown at the left-hand end of FIG. 1. The articles, which are normally flexible wall containers, are held in position by a pair of spaced side guides 14 and 14' which are supported, as by brackets 16 and 16'. Guide 14 has a pair of spaced rails, such as upper rail 18 and lower rail 18' whereas guide 14' has a pair of spaced rails, such as upper rail 20 and lower rail 20', as best seen in FIG. 2. The side rails all engage the containers along their flexible side walls and may deflect them, as shown. The deadplate 12 is provided with a diagonal downstream end 22 which is generally parallel to the centerline of the forward most row of cans 10 of the equilateral triangular configuration and has a plurality of laterally spaced longitudinal slots 24 which are positioned above and are substantially the same width as outside slots 26 in the top wall 28 of plenum 30. These slots serve to align the containers at the edge of deadplate 12 and prevent containers from being drafted onto the vacuum belt 34 prematurely by air moving across the deadplate and through openings 32. The center and inside slots 27 are of narrower width, as more fully described in my above-identified U.S. patent application. The slots 24 of deadplate 12 are aligned with longitudinal rows of perforations or openings 32 in endless transfer belt 34. Conveniently, endless belt 34 extends around a roller 36 which is mounted in bearings (not shown) whereby the transfer belt 34 can carry the articles downstream from the deadplate at a second higher rate of speed to move them into single file alignment. As will be apparent to one skilled in the art, a vacuum can be drawn in plenum 30 by means of a vacuum fan (not shown) connected thereto through suitable ducting (not shown).

Containers 10 are pushed along deadplate 12 by the mass of containers upstream therefrom by the movement of vacuum belt 11. As they are pushed along the deadplate, they may begin rolling along the side rails as illustrated with respect to containers 10A and 10C. When this happens, the center container, container 10B tends to be squeezed and forced between containers 10A and 10C. Because of their flexible sidewalls, as best seen in FIG. 2, the movement of container 10B between containers 10A and 10C can be accommodated. As this movement continues, container 10B will move ahead of container 10A at the downstream diagonal edge 22 of deadplate 12, as shown in FIG. 1. When this happens, because of the resiliency of the container sidewalls, the articles leave the end 22 of deadplate 12 and the restraint of guides 14 and 14', the kinetic energy stored by the flexing of the side walls will cause container 10A to be forced outwardly out of alignment with the downstream single file guides 38 and 38'. In other words, the vacuum force being drawn through openings 32 in belt 34 will not be sufficient to restrain the lateral movement of the container. As the containers continue downstream as shown in phantom in FIG. 1 it can be seen that when they approach single file guides 38 and 38' that container 10B, which is being slid laterally by diagonal deflector 40, will push container 10A out of position so that it will fall off the side of the belt. The paths of containers 10A, 10B and 10C are shown by dotted lines 41, 42 and 43.

It will be understood that this misalignment of the containers will not happen all of the time but with unfinished or bright cans the surfaces are very rough and it is quite easy for them to begin rolling along the side guides whereby the condition just described can occur. The greater the speed at which the device operates the more likelihood of the misalignment occurring.

The present invention is shown in FIGS. 3, 4 and 5 wherein the same reference numerals have been used for the same parts. As best seen in FIG. 4, the rails 18 and 18' of guide 14 have been lowered so that the bottom most guide engages the container at the chine 44 which is at a location where the container is not flexible. The upper guide 18 engages the sidewall but does not deflect it, unless it starts to tip, because the containers always stay in their precise alignment. Similarly, the guide 14 has guide rails 20 and 20' lowered in the same manner. Thus, the containers will be moved by vacuum belt 11 along the deadplate at a first speed in their contiguous tight equilateral configuration and will stay in that configuration throughout their movement because there is no resilience at the chine to allow them to roll upon one another as described above.

In addition, the leading edge 22' of deadplate 12 terminates at its downstream end in a portion 46 which is perpendicular to the direction of movement of the containers. Slots 24 are only provided over the openings 32 which pass under the position of container 10A. A single slot 48 is also provided over one row of openings 32 over which container 10B passes but this slot is approximately one-half the width of slots 24. As a result of this arrangement, as the diagonal row of containers are pushed across deadplate 12 by vacuum belt 11 and approaches the edge 22' of deadplate 12, they are maintained in their alignment by slots 24 and 48 which prevent the containers from being drafted across the edge of the deadplate prematurely. As best illustrated in FIG. 5, the vacuum causes air to move across deadplate 12 in the direction of arrows 49. However, slots 24 allow container 10A to be held against deadplate 12 in a predetermined final position until the next container 10A pushed the first one onto vacuum belt 34. Because of the geometry of the deadplate and rails, with container 10A in a precise fixed position, containers 10B and 10C will also be in a precise fixed position since they cannot move ahead of container 10A. Should container 10A be missing slot 48 serves the same purpose for container 10B. No alignment is required for container 10C if both containers 10A and 10B are missing.

Container 10A is drawn onto belt 34 by the vacuum more quickly than the other containers because of the presence of the truncated end portion 46 so that container 10A moves out on the transfer belt ahead of the other containers as shown in phantom. It can be seen that as long as container 10A stays ahead of containers 10B and 10C, it will not be caused to move out of its straight line path 50 but rather containers 10B and 10C will be brought into alignment behind container 10A by means of deflector 40 which will slide the containers 10B and 10C across the transfer belt against the downward force created by the vacuum being drawn in plenum 30. Thus, container 10B will move along path 51 and container 10C will move along path 52. With this highly advantageous arrangement, the containers virtually will never move out of alignment and much greater speeds of container movement are possible to move the containers from a mass configuration into single file.

From the foregoing, the advantages of this invention are readily apparent. The guide rail and deadplate arrangement assures that the containers remain in a tight contiguous equilateral triangular arrangement so that the containers move off of the deadplate in diagonal rows. The deadplate construction causes the most downstream container to move ahead of the others as the containers move onto the transfer belt so that the containers are brought into alignment by the deflector as the containers reach the single file rails.

This invention has been described in detail with reference to a particular embodiment thereof, but it will be understood that various other modifications can be effected within the spirit and scope of this invention.

What is claimed is:

1. An article alignment device for maintaining flexible wall cylindrical articles, which are supplied at a first upstream location in a three row width having an equilateral triangular configuration in which all articles are contiguous, so that they are discharged onto a vacuum belt at a second downstream location in a predetermined predictable and repeatable pattern, said apparatus comprising:

a deadplate extending from said upstream location to said downstream location, said deadplate having a diagonal downstream end which is parallel to the centerline of a diagonal row of articles forming the leading edge of the equilateral triangular configuration;

means for moving the articles across said deadplate at a first predetermined rate of speed;

a vacuum transfer belt having a reach with an article conveying side and a vacuum side and a centerline, said reach extending downstream from under the downstream end of said deadplate to transfer the articles to a single file location, said belt having a plurality of longitudinal rows of openings and an inside edge and an outside edge;

means for moving said belt downstream from said deadplate at a second greater rate of speed;

a plenum for drawing a vacuum through said rows of openings in said transfer belt on said vacuum side to hold the articles against said belt;

a deflector extending from said article conveying side of said belt at an angle across said belt from said inside edge of said belt to a point spaced from said outside edge of said belt a distance slightly greater than the diameter of the articles to realign the diagonal row of articles into a longitudinal row of articles; and a pair of parallel side guides each having a lower rail against said deadplate and being spaced apart a distance to hold the articles in fixed equilateral triangular configuration in mutual contacting relationship so that the diagonal rows of articles are aligned with said diagonal end of said deadplate as they are moved thereacross.

2. Apparatus, as claimed in claim 1, further including: apertures in said deadplate adjacent said downstream end under only the location of the center and outside articles in the diagonal row so that vacuum drawn through said transfer belt will hold the rows of articles in a predetermined, precise alignment before being moved onto said transfer belt by the trailing row of articles.

3. Apparatus, as claimed in claim 1, wherein said apparatus comprise:

a pair of longitudinal slots extending over said rows of openings in said transfer belt which extend under the portion of said deadplate over which the outside article in the diagonal row is positioned; and a third longitudinal slot extending over one of said rows of openings in said transfer belt which extends under the portion of said deadplate over which the center article in the diagonal row is positioned.

4. Apparatus, as claimed in claim 3, wherein:

said pair of longitudinal slots have a width substantially equal to the diameter of said openings in said transfer belt; and said third longitudinal slot has a width which is one-half the width of said pair of longitudinal slots.

5. Apparatus, as claimed in claim 2, wherein:

the edge of said diagonal downstream end of said deadplate has a truncated outside portion, over which the outside article of the diagonal row passes, which is perpendicular to the direction of movement of said transfer belt so that the leading edge of the outside article extends onto said belt when the row of articles are aligned along the diagonal edge of said downstream end of said deadplate so that the outside article is drawn to and moved downstream by said transfer belt before the other articles in the row to space the outside article ahead of the centerline of the diagonal row.

6. An article alignment device for maintaining cylindrical articles which are supplied at a first upstream location in a three row width having an equilateral triangular configuration in which all articles are contiguous, so that they are discharged onto a vacuum belt at a second downstream location in a predetermined predictable and repeatable pattern, said apparatus comprising:

a deadplate extending from said upstream location to said downstream location, said deadplate having a diagonal downstream end which is parallel to the centerline of a diagonal row of articles forming the leading edge of the equilateral triangular configuration;

means for moving the articles across said deadplate at a first predetermined rate of speed;

a vacuum transfer belt having a reach with an article conveying side and a vacuum side and a centerline, said reach extending downstream from under the downstream end of said deadplate to transfer the articles to a single file location, said belt having a plurality of longitudinal rows of openings and an inside edge and an outside edge;

means for moving said belt downstream from said deadplate at a second greater rate of speed;

a plenum for drawing a vacuum through said rows of openings in said transfer belt on said vacuum side to hold the articles against said belt;

a deflector extending from said article conveying side of said belt at an angle across said belt from said inside edge of said belt to a point spaced from said outside edge of said belt a distance slightly greater than the diameter of the articles to realign the diagonal row of articles into a longitudinal row of articles;

a pair of parallel side guides each having a lower rail against said deadplate and being spaced apart a distance to hold the articles in fixed equilateral triangular configuration in mutual contacting relationship so that the diagonal rows of articles are aligned with said diagonal end of said deadplate as they are moved thereacross;

a pair of longitudinal slots extending over said rows of openings in said transfer belt which extend under the portion of said deadplate over which the outside article in the diagonal row is positioned;

a third longitudinal slot extending over one of said rows of openings in said transfer belt which extends under the portion of said deadplate over which the center article in the diagonal row is positioned; and the edge of said diagonal downstream end of said deadplate has a truncated outside portion, over which the outside article of the diagonal row passes, which is perpendicular to the direction of movement of said transfer belt so that the leading edge of the outside article extends onto said belt when the row of articles are aligned along the diagonal edge of said downstream end of said deadplate so that said most downstream article is drawn to and moved downstream by said transfer belt before the other articles in the row to space the most downstream article ahead of the centerline of the diagonal row.

7. An improvement to a vacuum single filer for converging articles received in a wide mass at an upstream location to single file at a downstream location wherein said single filer includes a foraminous belt having a reach with an article conveying side and a vacuum side, said reach extending from an upstream location to a downstream location and having an inside edge and an outside edge, means for moving said belt from said upstream location to said downstream location, a deadplate at said upstream location across said article conveying side of said reach of said belt and having a leading diagonal edge to laterally align said articles in diagonal rows as they move onto said belt, vacuum plenum means on the vacuum side of said reach of said belt having a wall adjacent said reach with parallel longitudinal slots therein to draw a vacuum through said belt, a deflector extending from said article conveying side of said belt at an angle thereto from a point adjacent said inside edge of said belt at said upstream location to a point spaced from said outside edge of said belt a distance slightly greater than the diameter of the articles to form a single file discharge for the articles at said downstream location along an axis parallel to said centerline, and means providing a greater vacuum through said belt along said axis passing through said single file discharge to hold the outside article in each row aligned with said single file discharge and providing a lesser vacuum through said belt to other articles so that they can be slid across said belt by said deflector to bring them into single file alignment along said parallel axis behind the outside article at said single file discharge; the improvement comprising:
- a pair of longitudinal slots extending over said rows of openings in said transfer belt which extend under the portion of said deadplate over which the outside article in the diagonal row is positioned; and
- a third longitudinal slot extending over one of said rows of openings in said transfer belt which extends under the portion of said deadplate over which the center article in the diagonal row is positioned.

8. Apparatus as claimed in claim 7, wherein: the edge of said diagonal downstream end of said deadplate has a truncated outside portion, over which the most downstream article of the diagonal row passes, which is perpendicular to the direction of movement of said transfer belt so that the leading edge of the article extends onto said belt when the row of articles are aligned along the diagonal edge of said downstream end of said deadplate so that said outside article is drawn to and moved downstream by said transfer belt before the other articles in the row to space the outside article ahead of the centerline of the diagonal row.

9. Apparatus, as claimed in claim 7, further including:
a pair of parallel side guides each having a lower rail against said deadplate and being spaced apart a distance to hold the articles in fixed equilateral triangular configuration in mutual contacting relationship so that the diagonal rows of articles are aligned with said diagonal end of said deadplate as they are moved thereacross.

* * * * *